Jan. 25, 1944.  A. B. WHITE  2,340,093
ARC WELDING SYSTEM AND METHOD OF ARC WELDING
Filed Dec. 3, 1942
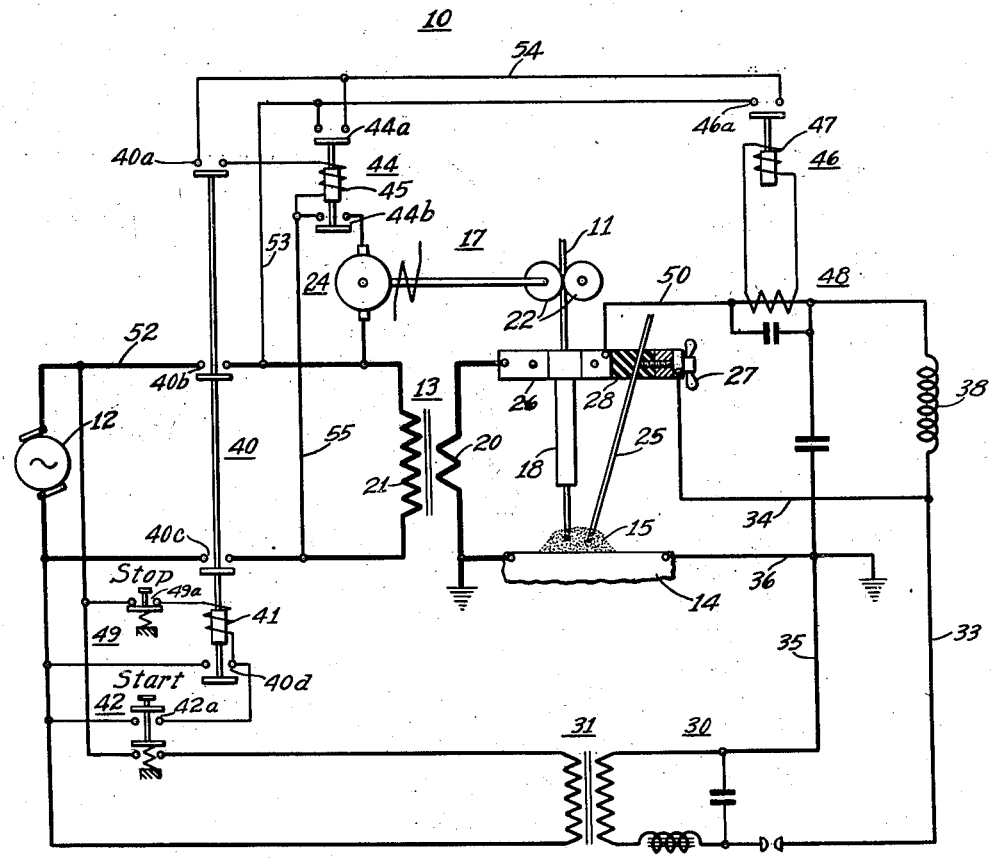
WITNESSES:
INVENTOR
Alfred B. White.
BY
ATTORNEY

UNITED STATES PATENT OFFICE 2,340,093

ARC WELDING SYSTEM AND METHOD OF ARC WELDING

Alfred B. White, Murrysville, Pa., assignor to Westinghouse Electric & Manufacturing Company, East Pittsburgh, Pa., a corporation of Pennsylvania Application December 3, 1942, Serial No. 467,723

9 Claims. (Cl. 219—8)

My invention relates generally to arc welding, and it has reference in particular to stabilized arc welding systems and methods of arc welding.

Generally stated, it is an object of my invention to provide an arc welding system that is inexpensive and simple to operate.

More specifically, it is an object of my invention to provide for initiating an arc welding process by means of a relatively high frequency auxiliary arc electrode positioned adjacent the welding electrode, and effectively insulated from the welding electrode and electrode feed motor so far as the the high frequency voltage is concerned.

It is also an object of my invention to provide for initiating a current flow between an auxiliary electrode positioned adjacent an arc welding electrode and spaced from the work upon which a welding operation is to be performed by means of a high frequency voltage, and prevent the high frequency voltage from being applied to the welding circuit and feed motor associated with the welding electrode.

Another object of my invention is to provide for using inductance means for blocking a high frequency arc initiating voltage from the welding circuit and the electrode feed motor without having the normal welding current pass through the inductance means.

It is also an important object of my invention to provide for initiating the flow of welding current from a welding electrode through a latively deep blanket of a substantially nonconducting welding flux by means of an auxiliary high frequency electrode positioned adjacent the welding electrode.

It is a further object of the invention to provide for energizing an auxiliary starting electrode associated with a main welding electrode by means of a high frequency voltage, and provide for the flow of power from the welding circuit to the auxiliary electrode while preventing the flow of high frequency current from the auxiliary electrode to the welding circuit.

Still another object of my invention is to provide for automatically controlling the energization of the welding electrode feed means when a power arc is initiated between an auxiliary electrode and the work upon which a welding operation is to be performed.

Yet another object of my invention is to provide for controlling the energization of an electrode feed motor in predetermined relation to the energization of the welding and high frequency arc stabilizing circuits in an automatic arc welding system.

Other objects will, in part, be obvious, and will, in part, be described hereinafter.

In practicing one embodiment of the invention, an auxiliary electrode may be positioned adjacent the main or welding electrode, which is connected to a relatively low voltage source of welding current, and in spaced relation to work upon which a welding operation is to be performed for striking an arc when welding through a relatively thick blanket of a normally nonconducting flux. It is to be understood that the term "arc" is used in a broad sense, and is intended to include the cases where the molten flux provides a conductive fluid path for the welding current, where the arc is submerged beneath the flux, and where it may be open or partially open. The auxiliary electrode is connected to a high frequency generator for initiating an arc or flow of current across the space between the electrode and the work upon which the welding operation is to be performed, and is insulated from the main or welding electrode. An electrical connection is provided between the main and auxiliary electrodes by inductance means having sufficient inductance to effectively insulate the welding circuit and associated welding equipment from the high frequency arc initiating voltage, and yet permit current to flow from the low voltage source through the auxiliary electrode to commence and sustain a power arc to melt the flux adjacent the welding electrode. By energizing the welding electrode and bringing it into contact with the pool of molten flux, the arc or current path may be transferred from the auxiliary to the main or welding electrode without requiring engagement of the main electrode with the work, and without subjecting the welding circuit or the welding electrode feed motor to the relatively high frequency voltage.

For a more complete understanding of the nature and scope of my invention, reference may be had to the following detailed description, which may be read in connection with the accompanying drawing, in which the single figure is a diagrammatic view of a welding system embodying the principal features of the invention.

Referring to the single figure of the drawing, the reference numeral 10 may denote generally an arc welding system wherein a welding electrode 11 may be connected to a suitable source of welding current 12 by means of a welding transformer 13 for performing a welding operation on work 14 through a relatively thick blanket of a flux 15 which may be generally non-conducting, and may form a conductive path when melted.

The welding electrode may be fed relative to the work 14 to maintain an arc therewith after it has been struck by electrode feed means denoted generally by the numeral 17. For example, means such as the elongated apertured nozzle 18 may be provided for guiding the electrode 11 and conducting current thereto from the secondary winding 20 of the welding transformer 13, the primary winding 21 of which is connected to the source 12. Feed rolls 22 may be provided having driving engagement with the welding electrode, one or more of the feed rolls being operatively connected to suitable driving means such as the motor 24.

In order to facilitate striking an arc between the electrode 11 and work 14 through the relatively thick blanket of flux 15, an auxiliary electrode 25 may be provided. The auxiliary electrode may comprise any suitable material, such as a metal of the same or similar nature as is being used in making the weld. Any conducting material that is not harmful to the weld may be used so long as it burns back with sufficient rapidity to permit transfer of the arc to the welding electrode within a reasonable time. The auxiliary electrode may be positioned adjacent the welding electrode 11, and may, for example, be supported on the nozzle support 26 and provided with suitable clamping means such as the thumbscrew 27 so that it may be readily brought within arcing distance of the work 14 through the flux 15. The nozzle support 26 may be of any suitable construction, being either part of a feed carriage (not shown) for moving the electrode 11 relative to the work, or part of the general feed means structure, or it may be separate therefrom. Insulation 28 may be provided for insulating the auxiliary electrode 25 from the nozzle 18, welding electrode 11 and electrode feed means 17.

The actual initiating of an arc between the auxiliary electrode 25 and the work 14 may be effected by suitable high frequency arc initiating means such as, the high frequency generator 30 which may be energized from a control transformer 31 connected to a suitable source such as the source 12, and connected between the auxiliary electrode 25 and the work 14 by means of the conductors 33, 34 and 35, 36.

In order to permit a power arc to be established between the auxiliary electrode 25 and the work 14 to melt the blanket of flux 15 adjacent the welding electrode 11, a suitable connection may be provided between the welding electrode and the auxiliary electrode. For example, inductance means such as the air core high frequency reactor 38 may be connected between the nozzle support 26 and the conductor 33 to provide a relatively low impedance to the flow of current from the welding transformer 13. At the same time, the reactor 38 provides a relatively high impedance to the flow of high frequency current from the high frequency generator 30 to the welding circuit and welding electrode feed means.

Accordingly, the high frequency voltage is effectively blocked from the welding circuit and the feed motor, and no more than the usual insulation need be provided in connection with the welding transformer 13 or the electrode feed motor 24, since they are not required to withstand the stresses normally set up by the application of relatively high frequency voltages.

In order to control the welding operation, switch means 40 may be provided for controlling the connection of the primary winding of the welding transformer 13 to the source 12. Operation of the switch means 40 may be effected by controlling the connection of the operating winding 41 thereof to the source 12 through the medium of a start push-button switch 42 which may also control the connection of the primary winding of the control transformer 31 to the source.

Means such as the control switch 44 having an operating winding 45 may be provided for controlling the connection of the electrode feed motor 24 to a suitable power source, such as, for example, the source 12. For the purpose of effecting energization of the electrode feed motor 24 in predetermined relation to the energization of the welding transformer 13 and the initiation of a power arc between the auxiliary electrode and the work, current responsive means such as the relay 46 may be provided. The operating winding 47 of relay 46 may be energized from a current transformer 48 connected between the main and auxiliary electrodes. By connecting the current responsive relay 46 so that it cooperates with the switch means 40 to complete an energizing circuit for the operating winding 45 of the control switch 44, energization of the electrode feed motor 24 may be effected only after the power arc has been struck between the auxiliary electrode and the work. A stop push button 49 may be provided in series circuit relation with the operating winding 41 of the switch means 40 for terminating a welding operation.

In order to commence a welding operation, the auxiliary electrode 25 may be positioned so that the gap between the electrode and the work may be broken down through the powdered flux by the high frequency arc initiating voltage. When the start push button 42 is closed, the control transformer 31 is connected to the source 12 and the high frequency generator 30 applies a relatively high frequency voltage between the auxiliary electrode 25 and the work 14 so long as the push button switch remains closed.

At the same time that the control transformer 31 is connected to the source, the operating winding 41 of the switch means 40 is energized through the normally open contacts 42a of the start push button and the normally closed contacts 49a of the stop push button. The switch means 40 operates to close its contacts 40a, 40b, 40c and 40d. Contacts 40d provide a holding circuit for the operating winding 41. The primary winding of the welding transformer 13 is connected to the source 12 so that a relatively low frequency low voltage is applied to the auxiliary electrode 25 from the secondary winding 20 through the conductor 50, the reactor 38 and conductor 34. A power arc or current path is thus formed between the auxiliary electrode 25 and the work 14 along the path through the flux ionized by the high frequency discharge.

As soon as a power arc is formed between the electrode 25 and the work 14, the operating winding 47 of the current responsive relay 46 becomes sufficiently energized from the current transformer 48 to effect operation of the relay. An energizing circuit is thereby provided from the source 12 through conductor 52, contacts 40b, conductor 53, contacts 46a, conductor 54, contacts 40a, operating winding 45, conductor 55 and contacts 40c to the other side of the source 12. The control switch 44 operates, closing contact members 44b, to connect the feed motor 24 to the source 12 and the contact members 44a to provide a holding circuit for the operating winding 45. The electrode 11 is accordingly fed toward the work 14 and strikes the surface of the pool of molten flux produced adjacent the electrode 11 by the power arc or conductive current path sustained between the auxiliary electrode 26 and the work 14.

A power arc or conductive current path may thus be provided between the electrode 11 and the work 14 through the molten flux. The arc between the auxiliary electrode 25 and the work 14 is extinguished as soon as the auxiliary electrode burns back an appreciable distance, while the arc or current path between the main electrode 11 and the work 14 is sustained, since the electrode 11 is fed towards the work by the feed motor 24. Suitable control means of any of the different types well known in the art may be utilized for controlling the operation of the feed motor 24 so as to maintain the electrode feed at a rate to sustain a stable arc between the electrode 11 and the work 14.

When it is desired to terminate a welding operation, the stop button 49 may be actuated to open its contacts 49a. The energizing circuit for the operating winding 41 of the switch means 40 is thereby interrupted, and the switch means returns to the deenergized position, disconnecting the welding transformer 13 and the operating winding 45 of the feed motor control switch 44 from the source. The welding transformer and the feed motor are thereby deenergized, terminating the welding operation.

From the above description and the accompanying drawing, it will be apparent that I have provided in a simple and inexpensive manner for initiating an arc or conductive current path between a welding electrode and work through a relatively deep blanket of a nonconducting flux. Initiation of the arc or current path is easily effected by the high frequency voltage without subjecting the welding transformer, the electrode feed motor or any other associated apparatus to the usual stresses incident to the use of high frequency arc initiating voltages. By insulating the auxiliary electrode from the welding electrode and providing a high frequency blocking reactor in the circuit between the auxiliary electrode and the welding electrode, the high frequency voltage is effectively blocked from the low voltage circuits and the normal welding current is not required to pass through the high frequency blocking reactor. Accordingly, not only may the insulation of the electrode feed motor and the welding transformer be designed for lower voltages, but a much smaller capacity reactor may be used for blocking the high frequency therefrom, since the arc current passes through the reactor only during the initial stages of striking the power arc.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. A welding system for welding through a blanket of welding material which is a poor conductor when cold and conductive when molten comprising, a welding circuit including a main electrode connected to a source of welding current and positioned in spaced relation to a workpiece upon which the welding material is placed, an auxiliary electrode positioned adjacent to and insulated from the main electrode, and a high frequency generator connected to the auxiliary electrode and the workpiece for initiating an arc through the welding material to melt a portion of the material and provide a conductive path for current from the main electrode.

2. The combination in a welding system, of a welding circuit including a main electrode connected to a source of welding current for performing a welding operation upon work to be welded, an auxiliary electrode positioned in insulated relation to the main electrode and so spaced relative to the work and the main electrode that an arc may be initiated between the auxiliary electrode for providing a current path between the main electrode and the work, a high frequency generator connected to the auxiliary electrode and to the work for initiating an arc with the work, and circuit means connecting the main and auxiliary electrodes to provide a path for current from the welding source through the auxiliary electrode including inductance means effective to block the high frequency voltage from the welding circuit without appreciably impeding the flow of current from the source to the auxiliary electrode.

3. A welding system comprising, a main electrode connected to a relatively low frequency source of welding current and provided with electrode feed means for feeding the main electrode relative to a workpiece, an auxiliary electrode positioned in spaced and insulated relation to the main electrode, a high frequency generator connected to the auxiliary electrode to initiate a current path between the auxiliary electrode and workpiece, means controlling the energization of the feed means, circuit means providing a relatively low frequency conductor between the main and auxiliary electrodes and a relatively high impedance to a high frequency current, and control means responsive to a predetermined current in said circuit means to effect energization of the control means for the electrode feed means.

4. An automatic arc welding system comprising, a welding circuit including a main arc welding electrode connected to a relatively low frequency source of welding current, feed means operatively connected for feeding the main electrode relative to work upon which a welding operation is to be performed, an auxiliary electrode positioned in arcing relation with the work, said auxiliary electrode being supported in spaced and insulated relation to the main electrode, a high frequency generator connected between the auxiliary electrode and the work, inductance means connecting the main and auxiliary means, switch means controlling the energization of the welding circuit and the high frequency generator, and means responsive to the flow of current from the welding circuit to the auxiliary electrode operable to effect energization of the electrode feed means.

5. Arc control means for a welding system including an arc welding circuit having a welding electrode connected to a relatively low frequency source of welding current and feed means for feeding the electrode relative to work upon which a welding operation is to be performed comprising, a substantially fixed auxiliary electrode positioned in arcing relation to the work and in spaced and insulated relation to the welding electrode, a high frequency generator connected between the auxiliary electrode and the work, inductance means connected between the welding and auxiliary electrodes to provide a relatively low impedance path to current from the low frequency source to the auxiliary electrode and a relatively high impedance to current from the high frequency generator, switch means operable to effect energization of the welding circuit and the high frequency generator, control switch means controlling the energization of the electrode feed means, and means responsive to the flow of current between the welding and auxiliary electrodes cooperative with said switch means to effect energization of the control switch means.

6. The combination in arc welding apparatus, of a nozzle for guiding a welding electrode and conducting welding current thereto from a source for maintaining an arc with a workpiece, an auxiliary electrode disposed to be energized from a high frequency source, and means supported by the nozzle for positioning the auxiliary electrode in arcing relation to the workpiece and in spaced and insulated relation to the welding electrode for initiating an arc between the welding electrode and the workpiece.

7. Arc welding apparatus comprising electrode feed means including a nozzle for guiding an arc welding electrode connected to a source of welding current, feed means associated with the nozzle for feeding the welding electrode relative to work upon which a welding operation is to be performed to maintain a current conducting path between the welding electrode and the work, an auxiliary electrode supported by the nozzle in spaced and insulated relation to the welding electrode and connected to a high frequency source for initiating a current path with the work, and inductance means connecting the main and auxiliary electrodes to provide a low impedance path from the source and block the high frequency voltage from the electrode feed means.

8. Arc welding apparatus comprising, a conducting nozzle adapted to be connected to a relatively low frequency source for supplying current to and guiding a welding electrode, feed means for feeding the electrode through the nozzle relative to work upon which a welding operation is to be performed, an auxiliary electrode mounted on the nozzle and insulated from the welding electrode having one end within arcing distance of the work and spaced from the welding electrode a distance greater than the arcing distance, a high frequency generator connected between the auxiliary electrode and the work, circuit means connecting the welding and auxiliary electrodes including a current transformer and a reactor effective to block the high frequency from the nozzle and electrode feed means, switch means operable to connect the nozzle and the high frequency generator to the low frequency source, and control means energized from the current transformer operable in cooperation with the switch means to effect energization of the feed means.

9. A method of initiating an arc between a welding electrode and work through a relatively thick blanket of normally non-conductive flux which comprises, initiating an arc between the work and an auxiliary electrode positioned adjacent the welding electrode by applying a relatively high frequency voltage to the auxiliary electrode and blocking it from the welding electrode, supplying power to the welding and auxiliary electrodes to sustain the arc and melt the flux in the proximity of the welding electrode, feeding the welding electrode into the molten flux and permitting the auxiliary electrode to melt back beyond arcing distance so that an arc is formed between the welding electrode and work.

ALFRED B. WHITE.